United States Patent
Byers

(10) Patent No.: US 6,913,412 B1
(45) Date of Patent: Jul. 5, 2005

(54) MULTI-USE FLEXIBLE STRAP AND BASE CONNECTOR

(76) Inventor: Gary L. Byers, P.O. Box 2958, Columbia Falls, MT (US) 59912

( * ) Notice: Subject to any disclaimer, the term of this patent is extended or adjusted under 35 U.S.C. 154(b) by 0 days.

(21) Appl. No.: 10/759,441

(22) Filed: Jan. 16, 2004

(51) Int. Cl.$^7$ .................................................. F16D 1/00
(52) U.S. Cl. ........................... 403/220; 16/82; 403/224; 403/229; 248/205.9
(58) Field of Search ................................. 403/220, 221, 403/222, 224, 229; 16/82; 248/205.9; 292/288

(56) References Cited

U.S. PATENT DOCUMENTS

| | | |
|---|---|---|
| 2,608,711 A | 9/1952 | Moore |
| 3,059,952 A | 10/1962 | Wittman et al. |
| 3,321,166 A | 5/1967 | Gordon |
| 4,469,358 A | 9/1984 | Abbott |
| 4,813,641 A | 3/1989 | Wilson |
| 4,863,129 A | 9/1989 | Adams |
| 5,253,393 A | 10/1993 | Levin |
| 5,328,434 A | 7/1994 | Carroll |
| 5,391,104 A | 2/1995 | George |
| 5,405,112 A | 4/1995 | Trethewey |
| 5,481,764 A | 1/1996 | Nelson |
| 5,806,816 A | 9/1998 | Hull et al. |
| D421,556 S * | 3/2000 | Smith ........................... D8/14 |
| 6,039,371 A * | 3/2000 | Smith ........................ 294/8.6 |

* cited by examiner

Primary Examiner—John R. Cottingham
(74) Attorney, Agent, or Firm—Dowrey Rickards PLLC

(57) ABSTRACT

A flexible strap restraint assembly including a hollow tubular strap, a connector pin device for connecting the end of the strap to a suction cup base assembly. The connector pin includes an extent of reduced cross sectional area between the suction cup and the strap end providing a living hinge to allow the strap to be directed in a plurality of different directions.

13 Claims, 2 Drawing Sheets

MULTI-USE FLEXIBLE STRAP AND BASE CONNECTOR

BACKGROUND OF THE INVENTION

1. Field of the Invention

The present invention relates to multi-use flexible straps and base connector elements and more particularly to such flexible strap devices for restraining shiftable articles on a rack or shelf. The invention has special application to such base or anchor devices as suction cups widely used for connecting straps and the like to smooth impermeable surfaces such as window glass, table tops, cabinet walls and many others. Typical uses include smooth walls in cabinets, refrigerators, showers and other smooth wall areas. These uses occur in environments such as home, RV, camper, auto, boat and many others without limitation.

2. Description of the Prior Art

Many designs and methods have been created in the prior art for connecting flexible holding straps to suction cups or other bases for various purposes. U.S. Pat. No. 5,806,816 to Harold L. Hall et al., and U.S. Pat. No. 2,608,711 to J. L. Moore are illustrative of the method of simply passing a flexible strap through an aperture in a suction cup boss. This type of connector is simplistic and usually does not permit rearrangement or disassembly without either untying the ends of the flexible strap or destroying these elements.

U.S. Pat. No. 4,863,129 to Adams and U.S. Pat. No. 4,813,641 to Wilson illustrate the type of connector which requires either the use of adhesives or the integral molding of the flexible strap or tether to the boss of the suction cup. Other prior art devices utilize flexible straps, chains or the like which are connected to the boss of a suction cup or other base by mechanical means such as hooks, springs or other metal elements. The following listed patents are exemplary of this type of prior art.

| U.S. Pat. No. | Patentee |
| --- | --- |
| 5,481,764 | Nelson |
| 5,391,104 | George |
| 5,253,393 | Levin |
| 3,321,166 | Gordon |
| 3,059,952 | Wittman et al. |

The following listed patents are of general interest for their disclosure of various uses of suction cup bases in the prior art.

| 5,405,112 | Trethewey |
| --- | --- |
| 4,469,358 | Abbott |
| 5,328,434 | Carroll |

SUMMARY OF THE INVENTION

The flexible strap and connector structure of the present invention comprises in the preferred embodiment, a connector base in the form of a suction cup, a connector pin engageable in a bore in the boss of the suction cup and a flexible tubular strap engageable on the connector pin. The opposite ends of the flexible strap may each be provided with a base and connector pin combination for spanning between two spaced surfaces. The suction cup base includes an upstanding boss on its outer surface having a bore for reception of the connector pin. The connector pin includes an enlarged head for engaging the surface on one side of the boss and a central shaft which extends through the bore in the boss and protrudes on the opposite side. The protruding portion of the connector pin shaft has an extended connector terminal end and an extent of reduced cross sectional area located between the connector terminal end and the surface of the base when assembled. The connector pin may be molded from semi-rigid plastic material and the reduced cross sectional area performs as a living hinge on the protruding portion of the connector pin shaft. The flexible strap may comprise and elastic tubular element with the hollow center being sized and configured to engage and grip the protruding connector terminal end of the connector pin. With this structure the flexible strap may be extended and tensioned between two surfaces suitable for holding the suction cup bases.

DETAILED DESCRIPTION OF THE PREFERRED EMBODIMENT

Figure 1:
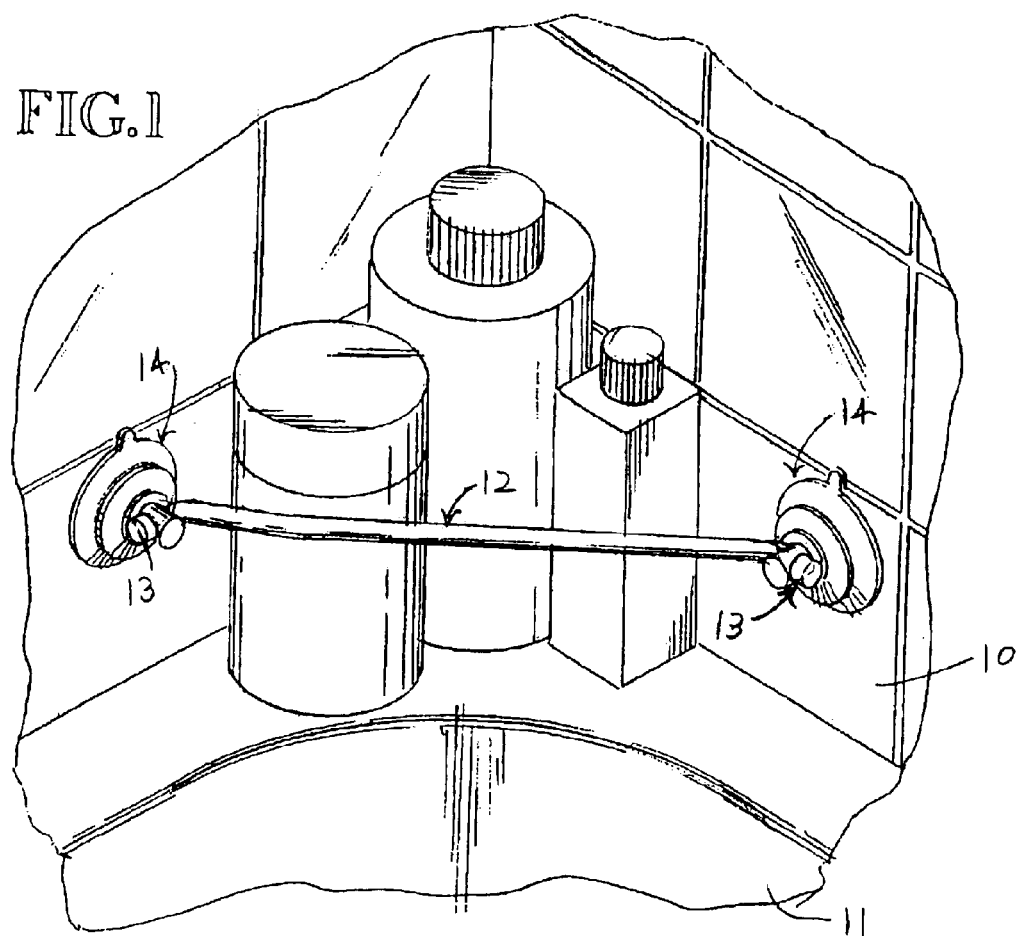
FIG. 1 is a perspective view illustrating the flexible strap installed in a wall corner.
Figure 2:
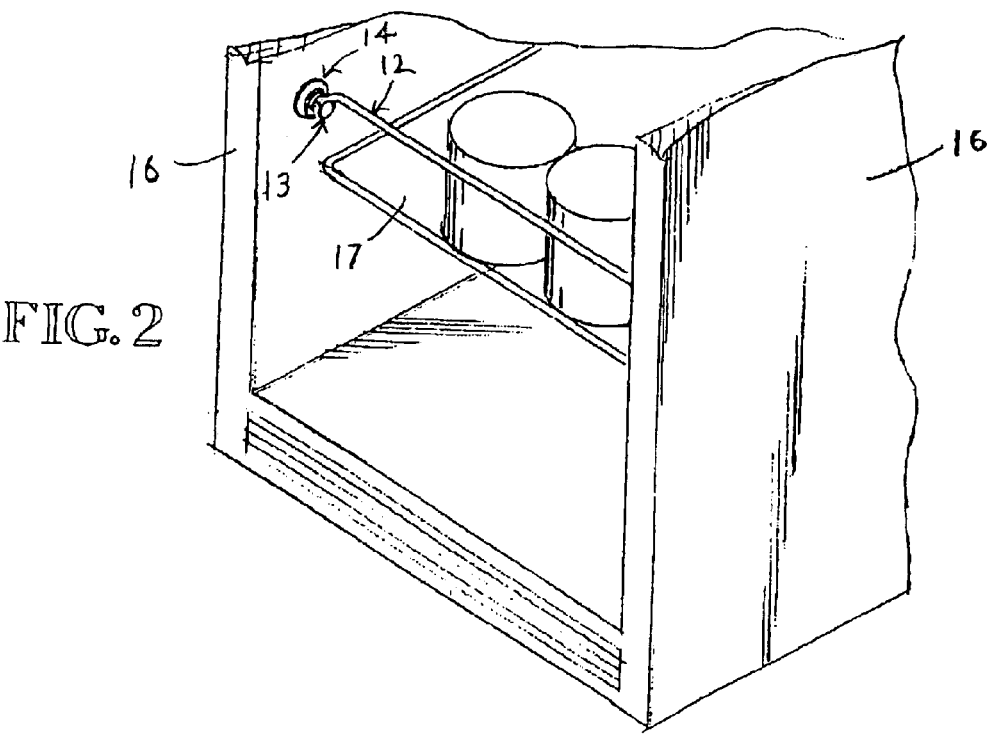
FIG. 2 is a perspective view illustrating the flexible strap installed in a cabinet shelf.

Referring to FIG. 1, the flexible strap assembly is illustrated mounted in the corner of a tiled bathroom wall 10 directly above the bath tub 11. In this use the strap 12 will be tensioned at an angle with respect to the suction cup bases to restrain articles resting on the bath tub ledge. The assembly includes the flexible strap 12, connector pins 13 and suction cup bases 14. It will be understood that the opposite ends of the flexible strap may be of identical construction, hence only one base and connector pin assembly will be described in detail. The suction cups 14 may be of any conventional well known design constructed from flexible material such as rubber or soft plastic capable of holding a seal. The suction cup utilizes a collapsible cavity which forms a vacuum pressure retention when pressured against an impermeable surface such as glass, tile or painted gloss surface. The suction cup is often released by lateral tilting or otherwise forcing the edge of the cup to be raised so as to break or vent the vacuum. FIG. 2 illustrates another installation wherein the flexible strap is mounted between the opposing surfaces of two parallel walls 16 for restraining articles on a shelf 17, such as found in a refrigerator or other cabinet structure. In this use the flexible strap is tensioned parallel to the central axis of the suction cup.

Figure 3:
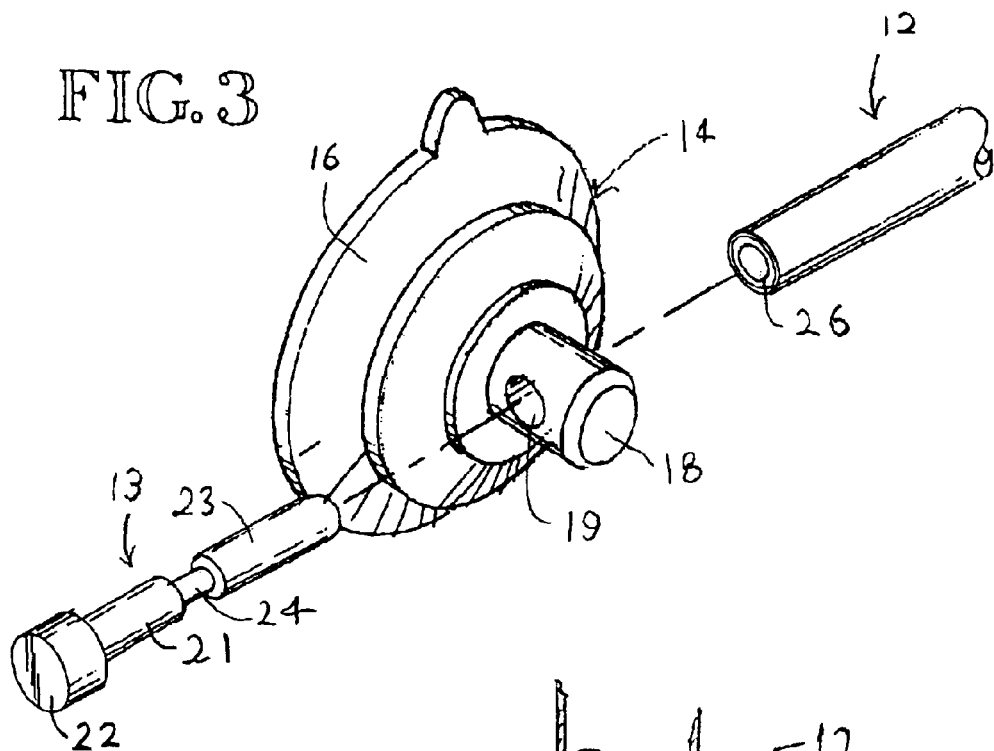
FIG. 3 is an exploded perspective view of the strap, connector and base assembly.
Figure 4:
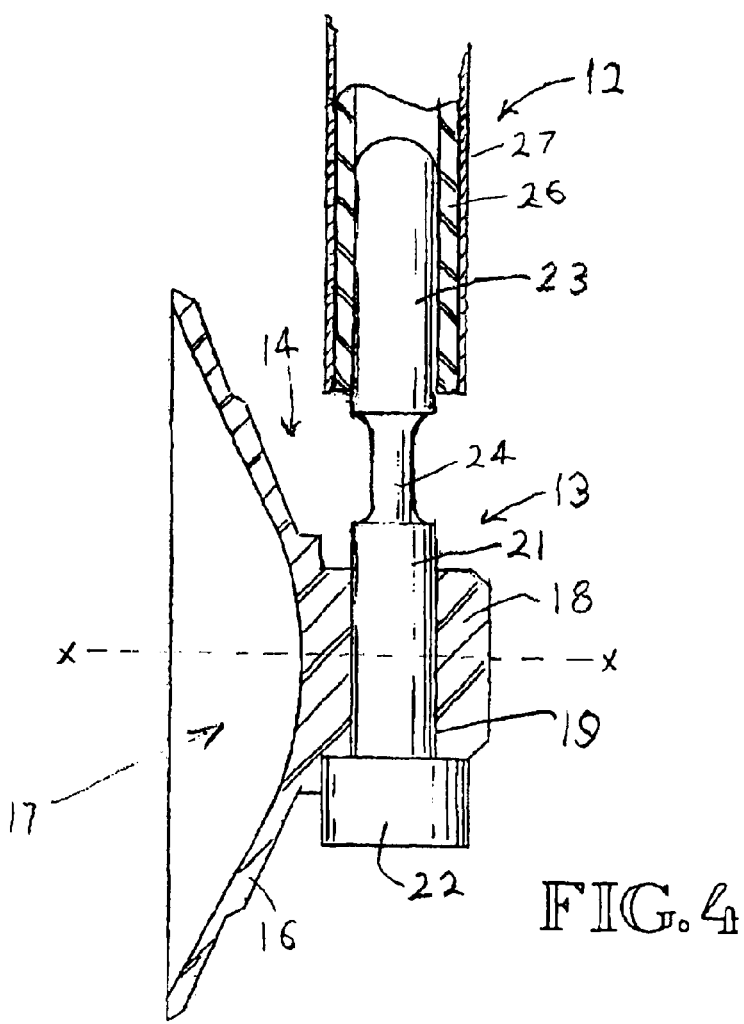
FIG. 4 is a cross sectional view of the assembly.

Referring to FIGS. 3 and 4, a typical suction cup 14 suitable for the present invention is illustrated. As aforementioned, the suction cup may be of conventional design having a flexible cup body 16 forming a cavity 17 which forms a vacuum retention when pressured against an impermeable surface. The cup body is molded integrally with a centrally located boss 18 which extends from the surface of the cup body opposite the cavity 17. Through bore 19 is formed in the boss 18 and extends transversely to the central axis x—x of the boss and cup body. The suction cup structure and bore 19 are usually formed by known molding processes from rubber or flexible plastic materials well known in the art.

Referring again to FIGS. 3 and 4, the connector pin 13 is formed with a shaft 21 a head or cap 22, a terminal end connector portion 23 and a reduced diameter section 24. The connector pin shaft 21 and terminal connector 23 may be cylindrical in shape with an outside diameter which permits the pin to be passed through the bore 19 in the boss 18 with a somewhat snug fit. The head portion 22 of the connector pin will engage one side of the boss 18 when the two elements are assembled as illustrated in FIG. 4 so as to limit the movement of the pin in one direction. The pin 13 may be formed by any well known molding process so as to comprise an integral structure. The pin may be fabricated from any number of well known plastic materials with the sections 21 and 23 being semi-rigid or slightly flexible. The portion 24, because of its reduced diameter and the nature of the plastic material, is extremely flexible or bendable for reasons to be described. When the pin 13 is assembled in the bore 19 of the suction cup boss, the reduced diameter hinge portion 24 will be located outside of the bore 19 a sufficient extent so as to allow the terminal connector end 23 to be selectively displaced in any direction relative to the shaft portion 21.

The connector strap 12 in the present embodiment comprise a hollow tubular elastic strap usually constructed from rubber or other flexible and elastic material. The strap 12 may be formed from elastic tubing referred to as surgical tubing which is well known in the art and commercially available. If desired, the tubing 26 may be provided with any suitable covering or coating 27 for the sake of appearance and durability. The internal diameter of the elastic tubing 26 is chosen so as to snugly fit and tightly engage the connector end 23 as shown in FIG. 4. Because of the elastic nature of the flexible tubing, when stretched or tensioned in the longitudinal direction, the diameter of the elastic tubing tends to decrease and thereby further enhance the gripping action between itself and the terminal connector end 23. With this arrangement, tensioning of the flexible strap 12 in a direction along the longitudinal axis of the connector pin results in a gripping action on the connector terminal end 23 with the pin being restrained against the boss 18 by the head 22 of the pin.

From the foregoing description it will be recognized that present flexible strap and suction cup base along with the novel connector pin assembly provides significant improvements in such devices over known prior art attempts. The connector pin and tubular elastic strap engagement provides an extremely tenacious connection which is enhanced progressively with increased tension in the strap. The flexible reduced cross section extent of the pin or living hinge allows the flexible strap and terminal connector of the pin to be pulled in a multitude of directions without sharply bending the elastic strap and at the same time relieving lateral stress forces on the suction cup base which otherwise tend to break the vacuum and release the base. With the present construction, the entire assembly may be formed from non metallic plastic materials, thus avoiding common problems associated with metallic surfaces. It will also be apparent that the assembly may be easily disassembled into its component parts for replacement, other uses or reuse.

Although the present preferred embodiment has been described in terms of certain specific structures, it will be apparent to those skilled in the art that many variations and modifications are possible. For instance, the connector pin shaft does not necessarily need to be circular in cross section and the flexible strap 12 can be changed in configuration to mate with the terminal portion of the connector pin. It will also be apparent to those skilled in the art that the hallow flexible strap 12 may be constructed from any flexible material with, as for instance, terminal end portions which will engage the terminal connector of the pin 13 in the manner described. Likewise, still further means of connecting the flexible strap 12 to the terminal end connector of the pin 13 may be devised. The suction cup base 14 may vary widely in its configuration and, in some instances, may be permanently attached to a surface by means other than vacuum pressure.

What is claimed is:

1. A connector for connecting a structural member to a boss on a base anchor element, said boss having a through bore, said connector comprising;

a semi-rigid shaft portion removably received in said bore, stop means for limiting travel of the shaft in one direction through the bore, a terminal end spaced from said shaft for connection to said structural member, and a reduced cross sectional extent located between said shaft and said terminal end, said shaft portion, said terminal end and said reduced cross sectional extent being of a single one-piece construction, said reduced cross sectional extent forming a living hinge between the shaft and the terminal connector.

2. The apparatus of claim 1 wherein said connector is comprised of semi-rigid molded plastic material, and said structural member comprises a hollow tubular elastic strap, said strap passing over said terminal end to tightly grip the surface thereof.

3. A restraining device comprising in combination;

a restraining member having opposite terminal ends, a base member for connection to the opposite ends of said restraining member, each said base member including means for attachment to a surface on one face and a protruding boss on the opposite face thereof, said boss including a through bore, and a connector pin removably received in said bore for connection to a terminal end of said restraining device, said connector pin including a shaft portion removably received in said bore, stop means for limiting travel of the shaft in one direction through the bore, a terminal connector on said pin spaced from said shaft for connection to said restraining member, and a reduced cross sectional extent located between said shaft and said terminal connector, said shaft portion, said terminal end and said reduced cross sectional extent being of a single one-piece construction, said reduced cross sectional extent forming a living hinge between the shaft and the terminal connector.

4. A flexible strap restraining device comprising in combination;

a hollow tubular elastic strap having opposite terminal ends, base members for connection to the opposite ends of said strap, each said base member including means for attachment to a surface on one face and an upstanding boss on the opposite face thereof, said boss including a through bore, and a connector pin removably received in said bore for connection to said strap, said connector pin including an enlarged head on one end engaging said boss to limit the travel of the pin in the bore, a shaft section extending through said bore, a terminal connector on the other end thereof and a reduced cross sectional extent forming a flexible hinge located between said shaft and said terminal connector said shaft section, said terminal connector and said reduced cross sectional extent being of a single one piece construction, the terminal end of said strap passing over said terminal connector in a snug fit for gripping action, whereby the gripping action of said strap terminal end is enhanced upon tensioning said elastic strap and said terminal connectors are movable about said flexible hinge.

5. The apparatus of claim 4 wherein;

said terminal connector has a right circular cylindrical surface, and said flexible strap comprises a hollow elastic tubular member having an inside diameter sized for snugly engaging said tubular connector to grip the surface thereof.

6. The apparatus of claim 5 wherein;

said connector pin comprises a semi-rigid unitary molded plastic body.

7. The apparatus of claim 6 wherein;

said base members comprise suction cups, said boss being formed on the surface of said opposite face.

8. A flexible strap restraining device comprising in combination;

a hollow tubular elastic strap having opposite ends for connection to base members, suction cup base members for connection to the opposite ends of said strap and attachment to smooth impermeable surfaces, each said suction cup base member including a vacuum retaining cavity on one face and an upstanding boss on the opposite face thereof, said boss including a central longitudinal axis extending normal to said cavity and a through bore extending normal to said longitudinal axis, and a semi-rigid plastic connector pin removably received in said bore for connection to said strap, said connector pin including an enlarged head on one end engaging said boss to limit the travel of the pin in the bore, a shaft section extending through said bore, a terminal connector on the other end thereof and a reduced cross sectional extent forming a flexible hinge located between said shaft and said terminal connector said shaft section, said terminal connector and said reduced cross sectional extent being of a single one piece construction, the terminal end of said strap passing over said terminal connector in a snug fit for gripping action, whereby the gripping action of said strap terminal end is enhanced upon tensioning said elastic strap and said terminal connectors are movable about said flexible hinge.

9. The apparatus of claim 8 wherein;

said terminal connector has a right circular cylindrical surface, and said flexible strap has an inside diameter sized for snugly engaging the cylindrical surface of said terminal connector.

10. The apparatus of claim 9 wherein;

said connector pin comprises a semi-rigid unitary molded plastic body.

11. A connector for connecting a structural member to a boss on a base anchor element, said boss having a transverse through bore, said connector comprising;

a semi-rigid shaft portion removably received in said bore, stop means on said shaft for limiting travel of the shaft in one direction through the bore, a terminal end connector portion spaced from said shaft for connection to said structural member, and a flexible reduced cross sectional extent located between said shaft portion and said terminal end connector portion, said shaft portion, said terminal end connector and said reduced cross sectional extent being of a single one-piece construction, said flexible reduced cross sectional extent forming a living hinge between the shaft portion and the terminal end connector portion for transmitting multi-directional loads to said shaft portion.

12. The apparatus of claim 11 wherein said connector is comprised of semi-rigid molded plastic material, and said structural member comprises a hollow tubular elastic strap, said strap passing over said terminal end connector portion to tightly grip the surface thereof under tensile loading.

13. A connector for connecting a structural member to a boss on a base anchor element, said boss protruding from the base anchor element and having a longitudinal axis, a bore extending through said boss in a direction transverse to said longitudinal axis, said connector comprising;

a semi-rigid shaft portion removably received in said bore, stop means on said shaft for engaging said boss to limit travel of the shaft in one direction transversely through the bore, a terminal end connector portion spaced from said shaft portion and said boss for connection to said structural member, and a flexible reduced cross sectional extent on said connector located outside said bore and between said shaft portion and said terminal end connector portion, said shaft portion, said terminal end and said reduced cross sectional extent being of a single one-piece construction, said reduced cross sectional extent forming a living hinge between the shaft and the terminal end connector portion for transmitting multi-directional tensile loads to said shaft portion.

* * * * *

UNITED STATES PATENT AND TRADEMARK OFFICE
CERTIFICATE OF CORRECTION

PATENT NO. : 6,913,412 B1
DATED : July 5, 2005
INVENTOR(S) : Gary L. Byers

It is certified that error appears in the above-identified patent and that said Letters Patent is hereby corrected as shown below:

Column 5,
Line 52, insert a comma -- , -- after "connector".

Signed and Sealed this

Thirtieth Day of August, 2005

JON W. DUDAS
*Director of the United States Patent and Trademark Office*